(12) United States Patent
Zhao et al.

(10) Patent No.: US 10,564,938 B2
(45) Date of Patent: Feb. 18, 2020

(54) METHOD AND DEVICE OF RESOURCE ORCHESTRATION USING AN OBJECT-ORIENTED LANGUAGE

(71) Applicant: EMC IP Holding Company LLC, Hopkinton, MA (US)

(72) Inventors: Accela Yilong Zhao, Shanghai (CN); Yu Cao, Beijing (CN); Layne Lin Peng, Shanghai (CN); Jie Bao, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 252 days.

(21) Appl. No.: 15/630,924

(22) Filed: Jun. 22, 2017

(65) Prior Publication Data

US 2017/0371628 A1    Dec. 28, 2017

(30) Foreign Application Priority Data

Jun. 22, 2016   (CN) .......................... 2016 1 0459148

(51) Int. Cl.
| | |
|---|---|
| *G06F 15/173* | (2006.01) |
| *G06F 8/30* | (2018.01) |
| *G06F 9/50* | (2006.01) |
| *H04L 12/911* | (2013.01) |
| *G06F 8/60* | (2018.01) |

(52) U.S. Cl.
CPC .............. *G06F 8/315* (2013.01); *G06F 9/50* (2013.01); *G06F 9/5005* (2013.01); *H04L 47/78* (2013.01); *G06F 8/60* (2013.01)

(58) Field of Classification Search
CPC .. G06F 9/44505; G06F 9/5027; G06F 9/5061; G06F 9/45558; H04L 41/5045; H04L 47/822; H04L 43/0888; H04L 41/0806; H04L 41/145; H04L 47/823
See application file for complete search history.

(56) References Cited

U.S. PATENT DOCUMENTS

| | | |
|---|---|---|
| 9,582,328 B1 | 2/2017 | Tao et al. |
| 9,830,105 B1 | 11/2017 | Tummala et al. |
| 9,881,014 B1 | 1/2018 | Bono et al. |
| 9,916,202 B1 | 3/2018 | Seela et al. |
| 9,959,061 B1 | 5/2018 | Natanzon et al. |
| 9,983,942 B1 | 5/2018 | Seela et al. |
| 10,120,887 B1 | 11/2018 | Patel et al. |

(Continued)

*Primary Examiner* — Cheikh T Ndiaye
(74) *Attorney, Agent, or Firm* — BainwoodHuang

(57) ABSTRACT

Embodiments of the present disclosure relate to a method and a device of resource orchestration resources using an object-oriented language, and a program. Specifically the present disclosure discloses a method of resource orchestration using an object-oriented language comprising: creating a correspondence relationship from concepts in the object-oriented language to a requirement of resource orchestration; creating a workflow for implementing the resource orchestration and based upon the correspondence relationship; and implementing the resource orchestration based upon the correspondence relationship and the workflow. The present disclosure also discloses a device of resource orchestration using an object-oriented language, and a computer program product for performing steps of a method of resource orchestration using an object-oriented language.

20 Claims, 3 Drawing Sheets

(56) References Cited

U.S. PATENT DOCUMENTS

| | | |
|---|---|---|
| 10,120,925 B1 | 11/2018 | Natanzon et al. |
| 10,146,446 B1 | 12/2018 | Anchi et al. |
| 10,289,325 B1 | 5/2019 | Bono |
| 2017/0177324 A1* | 6/2017 | Frank .................... G06F 16/173 |

* cited by examiner

METHOD AND DEVICE OF RESOURCE ORCHESTRATION USING AN OBJECT-ORIENTED LANGUAGE

RELATED APPLICATIONS

This application claim priority from Chinese Patent Application Number CN201610459148.0, filed on Jun. 22, 2016 at the State Intellectual Property Office, China, titled "RESOURCE ORCHESTRATION METHOD AND DEVICE USING OBJECT-ORIENTED LANGUAGE" the contents of which is herein incorporated by reference in its entirety.

FIELD

Embodiments of the present disclosure generally relate to resource orchestration, and more specifically, to a method and a device of resource orchestration using an object-oriented language, and a computer program.

BACKGROUND

In the cloud age, in cloud resource orchestration, any items to be deployed and managed as resources are abstracted, for example, their details and deployment steps are specified by an executable code template, and the deployment is realized by a deployment engine. For example, Openstack Heat is a resource orchestration tool which can deploy various complex applications according to a template. Also, traditional Puppet is also an orchestration language where a deployment process of an application is defined by Puppet codes as a template. However, as to the cloud technologies, the growing complexity of Information Technology (IT) infrastructure and software applications, and their continuously shortened time-to-market always require better restoration tools.

SUMMARY

According to an aspect of the present disclosure, there is provided a method of resource orchestration using an object-oriented language, the method comprising: creating a correspondence relationship from concepts in the object-oriented language to a requirement of resource orchestration; creating a workflow for implementing the resource orchestration and based upon the correspondence relationship; and implementing the resource orchestration based upon the correspondence relationship and the workflow.

According to another aspect of the present disclosure, there is provided an electronic device comprising a processor and a memory. The memory is coupled to the processor and stores therein instructions executable by the processor, the instructions, when executed by the processor, cause the electronic device to: create a correspondence relationship from concepts in the object-oriented language to a requirement of resource orchestration; create a workflow for implementing the resource orchestration and based upon the correspondence relationship; and implement the resource orchestration based upon the correspondence relationship and the workflow.

According to a further aspect of the present disclosure, there is provided a computer program product being tangibly stored on a non-transitory computer readable medium and including machine executable instructions which, when being executed, cause a machine to perform the steps of the method of resource orchestration using an object-oriented language according to the aspect of the present disclosure.

BRIEF DESCRIPTION OF THE DRAWINGS

The features, advantages, and other aspects of the embodiments of the present disclosure will become more apparent from the following detailed description with reference to the drawings. Several embodiments of the present disclosure are illustrated herein by way of an example, and not limitation. In the drawings.

DETAILED DESCRIPTION OF EMBODIMENTS

Figure 1:
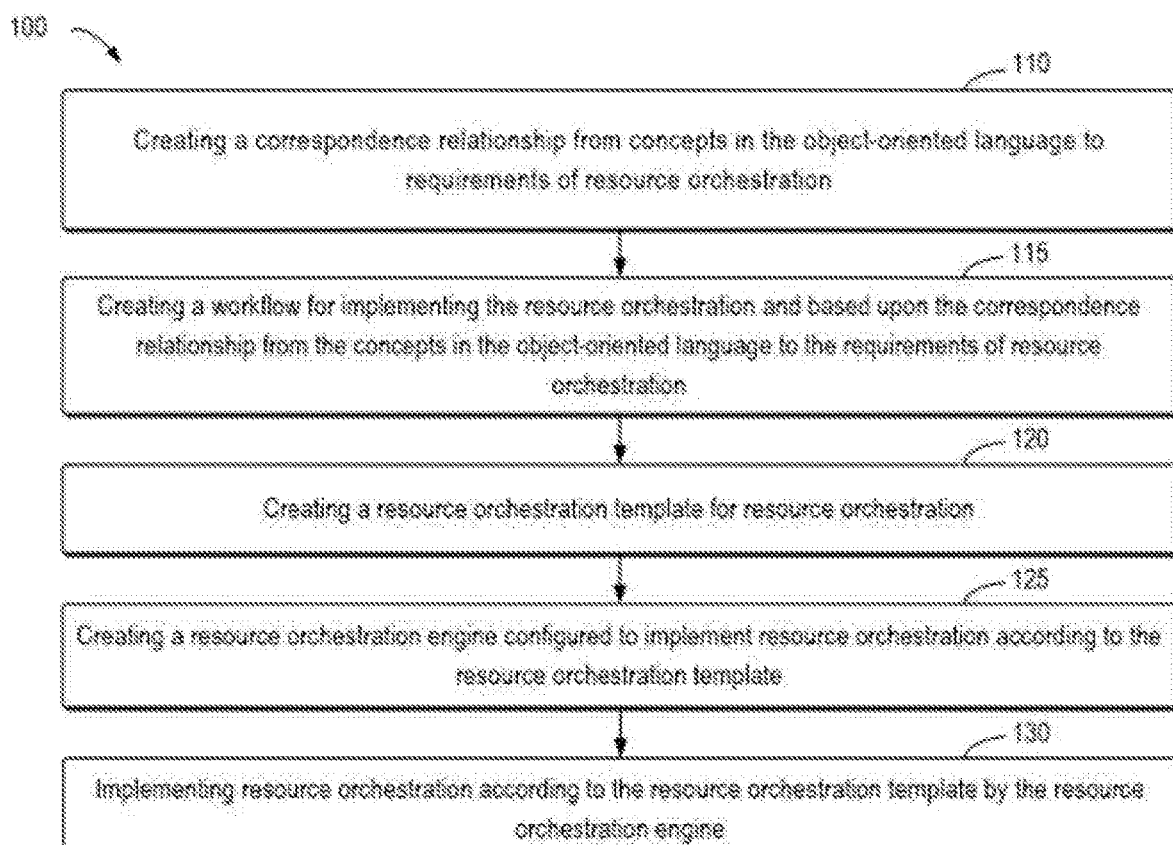
FIG. 1 is a flow chart of a method 100 of resource orchestration using an object-oriented language according to an embodiment of the present disclosure.

The respective exemplary embodiments of the present disclosure will be described below with reference to the drawings. The flowchart and block diagrams in the drawing illustrate the architecture, functionality, and operations of possible implementations of methods and systems according to various embodiments of the present disclosure. It shall be noted that each block in the flowcharts or block diagrams may represent a module, a program segment, or portion of codes that comprise one or more executable instructions for implementing the logical function(s) prescribed in the embodiments. It should also be noted that in some alternative implementations, the functions marked in the blocks may occur out of the order marked in the drawings. For example, two blocks shown in succession may, in fact, be executed substantially concurrently, or the blocks may sometimes be executed in the reverse order, depending upon the functionality involved. It will also be noted that each block of the flowcharts and/or block diagrams, and combinations of blocks in the flowcharts and/or block diagrams can be implemented by special purpose hardware-based systems that perform the specified functions or acts, or combinations of special purpose hardware and computer instructions.

It shall be appreciated that these exemplary embodiments are presented merely for the purpose of enabling those skilled in the art to better understand and further make use of the present disclosure, instead of limiting the scope of the present disclosure in any way.

In order to realize more ideal resource orchestration technologies, based on general requirements with respect to resource orchestration, object-oriented (OO) technologies are sued to realize resource orchestration to best fit the above requirements. Examples of object-oriented languages include, but not limited to Java, C++, C#, etc. Accordingly, there are provided resource orchestration technologies using an object-oriented language according to embodiments of the present disclosure, including a method and a device for resource orchestration using an object-oriented language, and a computer program.

The resource orchestration technologies using an object-oriented language as described herein can construct ideal resource orchestration tools through using the object-oriented languages to satisfy the general requirements with respect to resource orchestration. Also since the resource orchestration technologies as described in the present disclosure make use of the object-oriented languages, the resource orchestration work can be simplified, and the components in the resource orchestration technologies using an object-oriented language can be reused without any modification thereto. Accordingly, the resource orchestration technologies using an object-oriented language as described in the present disclosure create a bridge from the object-oriented languages the most widely applied in the worldwide community of developers to the growing challenge in resource orchestration.

The resource orchestration technologies using an object-oriented language as described in the present disclosure satisfy the various requirements for resource orchestration, for example, ranging from deployment time specifications to runtime lifecycle management. In comparison, the existing resource orchestration tools either fail to fully fulfill a complete set of those requirements, or they are crafted in their specific languages, so that the components in the resource orchestration technologies crafted in an object-oriented language can not be reused, thus resulting in a limited application scope thereof.

Resource orchestration using an object-oriented language according to the embodiments of the present disclosure will be described below taking cloud resources as an example. However, the technical solutions as recited in the present disclosure will not be limited to orchestration of cloud resources. The embodiments of the present disclosure can be realized in combination with any other types of resources which are known or to be developed in the future.

With respect to the various requirements for orchestration of cloud resources, they generally can be abstracted into the following two aspects. The first aspect is a deployment time requirement (denoted as "C1"), which indicates details of each cloud resource and a relationship between the cloud resources at a deployment time of cloud resources, which are typically described by a static orchestration template. The content indicated by the deployment time requirement is generally used for deployment of the cloud resources. The second aspect is a runtime requirement (denoted as "C2"), which indicates operations on the cloud resources after the cloud resources are deployed and the system comes into operation, these operations include, for example, monitoring states of the cloud resources (also referred to as properties of the cloud resources), operating directly on the cloud resources, and adding a relationship between the cloud resources (for example, a connection from a certain cloud resource to another cloud resource). The content indicated by the runtime requirement is generally used for lifecycle management of the cloud resources.

Although the various requirements for orchestration of cloud resources can be abstracted into the two aspects above, however, in order to satisfy the various requirements of the cloud resources more specifically, they can in more detail be abstracted into eight specific requirements, which cover cloud resource deployment automation at the deployment time of the cloud resources and lifecycle management at the runtime of the cloud resources, thus forming a complete set of features for orchestration of the cloud resources. The eight requirements are described as follows:

The first requirement (denoted as "R1") describes a cloud resource at deployment time and runtime, which may correspond to a deployment time requirement and a runtime requirement respectively, wherein a cloud resource template at deployment time can be deployed into multiple running instances at runtime.

The first requirement is satisfied to allow tracking both how a cloud resource shall be deployed, and its deployed instances, which is the basis of all other requirements in deployment time and runtime of the cloud resource.

The second requirement (denoted as "R2") describes properties of a cloud resource. These properties can be input parameters required at deployment time (for example, a DNS address, a database login, etc.); or output properties available at runtime (for example, an IP address and a port used for offering service, an average workload, etc.). The second requirement is satisfied to allow using input parameters to customize cloud resource deployment. More importantly, the second requirement allows viewing output properties of the cloud resource at runtime. For example, if a Zookeeper cloud resource is deployed, and a subsequent Cassandra resource wants to be connected to the Zookeeper cloud resource, then the Cassandra resource will need to use output properties of the Zookeeper cloud resource (i.e., a pair of a service address and a port, or a list of service addresses and ports) to build its connection character string. As another example, if a cloud resource is provided with a property "is_healthy", users may build it into a generic monitoring framework.

The third requirement (denoted as "R3") describes operations performed on a cloud resource. These operations are defined at deployment time and may be invoked at runtime. These operations are direct operations performed on the cloud resource, including common operations (for example, installing and removing of the cloud resource) and dedicated operations (for example, scaling out of a Cassandra cloud resource but not of a Redhat Package Management (RPM) package cloud resource). The third requirement is satisfied to allow interacting with the cloud resource at runtime by invoking the operations performed on the cloud resource, wherein installing and removing of the cloud resource are the basic for a deployment or redeployment process of the cloud resource. Also, some cloud resources may share some common operations, for example, scaling out or in, excluding or joining a node, restarting or shutting down a node, etc. Using these operations, users can implement a generic auto-scaling framework, or implement an auto-recovery by excluding a failing node and reinstalling it.

The fourth requirement (denoted as "R4") describes a reference to a cloud resource. If a cloud resource is necessary to be connected to another cloud resource, a relationship between these two cloud resources may be referred to as a reference (for example, a Cassandra cloud resource needs to be connected to a Zookeeper cloud resource). The reference can be defined at deployment time, but will only happen at runtime. This is because if a cloud resource needs to be connected, then it shall be connected to a running instance. The fourth requirement is satisfied to allow specifying the dependency of the cloud resource easier. It is very common in orchestration of cloud resources that a cloud resource needs to be connected to another cloud resource. The fourth requirement is satisfied to specify the dependency of the cloud resource in a template, and to realize automated cloud resource discovery, so that users neither need to remember host names, IP addresses or ports, nor need to write them manually into a configuration file or convert them to parameters.

The fifth requirement (denoted as "R5") describes composition of cloud resources. A larger cloud resource may be consisted of multiple smaller ones in orchestration of cloud resources, wherein these smaller cloud resources are considered to be parts of the larger cloud resource (for example, an Openstack cloud resource includes Cinder cloud resources). The composition of the cloud resources differs from the reference to the cloud resource because the composition of the cloud resource indicates that a cloud resource A is a part of a cloud resource B, whereas the reference to the cloud resource indicates that the cloud resource A only uses the cloud resource B. The fifth requirement is satisfied to allow building a larger cloud resource by composing smaller reusable ones. For example, an Openstack cloud resource is a complex cloud resource platform consists of tens of component cloud resources. The fifth requirement is satisfied to implement building a cloud resource template independently for each component cloud resource, and then compose them into a complex Openstack cloud resource. Subsequently, any component cloud resources can be extracted from the component cloud resources and reused in another different Openstack cloud resource template.

The sixth requirement (denoted as "R6") describes inheritance of a cloud resource. For example, cloud resources A1 and A2 may inherit from a cloud resource B, and declare that they include similar functions of the cloud resource B (for example, both HAProxy and Nginx both inherit from a cloud resource load-balancer, which indicates that they also perform load balancing). An interface in an object-oriented language is considered. Also, the cloud resources A1 and A2 may inherit from the cloud resource B to reuse codes of the cloud resource B (for example, both a Secure Shell (ssh) server and an ssh client inherit from a cloud resource ssh to reuse a configuration file of the cloud resource ssh). The sixth requirement is satisfied to allow the cloud resource to follow a common interface. For example, operations such as scaling-out or scaling-in, etc. may be performed on a scalable cloud resource. Accordingly, if the sixth requirement is satisfied, scaling-out or scaling-in may be performed on any inherited cloud resources, and users will be informed that these cloud resources are scalable. Accordingly, in the resource orchestration technologies using an object-oriented language according to the present disclosure, a generic framework may be built to detect which resource(s) is (are) scalable, and to scale out or in it (them) automatically. As another example, an application cloud resource may provide a property is_healthy (if normal), so any inherited cloud resource can be added to a monitoring framework by polling the property is_healthy.

The seventh requirement (denoted as "R7") describes an order of operations of a cloud resource. For example, one operation on the cloud resource may be required to be always executed after another operation on the cloud resource. Typically these operations to be executed in a strict order of operations refer to an operation "Install" to be used at deployment time (for example, a cloud resource webserver shall be installed after an operating system of the cloud resource). The seventh requirement is one of the basic requirements in orchestration of cloud resources. For example, a an operating system (OS) cloud resource shall be installed before any application cloud resource is installed, whereas a Docker cloud resource shall be installed before a Mesos cloud resource is deployed.

The eighth requirement (denoted as "R8") describes events of orchestration of cloud resources. For example, an operation on a cloud resource may need to be executed after a certain event happens (for example, a counter is operationally incremented by one each time a cloud resource is deployed). The eighth requirement is a common requirement in orchestration of cloud resources. The eighth requirement is satisfied to allow users to define, for example, customized operations after all cloud resources are deployed. For example, the operation may be invoking a web API to notify that the deployment is completed.

Based on the cloud resource orchestration technologies using an object-oriented language according to the present disclosure, the eight requirements above can be described by creating a template, and the template can be executed by creating an orchestration engine to thereby realize orchestration of the cloud resources while satisfying the eight requirements above, such that the orchestration of the cloud resources realized can work at both deployment time and runtime to in turn support deployment automation of and lifecycle management of the cloud resource.

In the cloud environment, although not required, the eight requirements above can all be satisfied to maximize various capabilities of the system. For example, it can be tried to deploy a complete cloud stack ranging from an Infrastructure-as-a-Service (IaaS) to a Platform-as-a-Service (PaaS) and further to a Software-as-a-Service (SaaS), where the deployment may be outlined as follows:

IaaS layer each component of Openstack (i.e., an IaaS) is a smaller reusable cloud resource template. One cloud resource template can be instantiated into multiple running instances for a High-Availability (HA) setup (the first requirement). Many Openstack cloud resource components need to be connected to a Keystone cloud resource, such that they contain references to the Keystone cloud resource (the fourth requirement). They compose together into the Openstack cloud resource IaaS (the fifth requirement). Each component has properties such as a service IP and a port, etc., and they expose parts of their configurations via the properties, such that their statuses can be viewed easily (the second requirement).

PaaS Layer PaaS Layer is CloudFoundry, and the majority of its components are scalable. Their resources inherit from a scalable resource, and necessary operations are performed thereon. The orchestration engine may monitor a real-time workload and perform auto-scaling by invoking their operations (the sixth requirement). The CloudFoundry cloud resource can also be decomposed into a series of smaller cloud resources (the fifth requirement) to reduce the complexity.

SaaS layer. SaaS layer is consisted of a group of applications running in CloudFoundry. These applications may inherit from an application base resource, which provides an operation "check_healthy" (the sixth property). Using this operation, orchestration of cloud resources may provide generic health monitoring. If the application cloud resource also supports operations such as excluding and joining a node, etc., then it can be utilized to build an auto-recovery framework (the third requirement). Also this can be used for a rolling upgrade by continuously excluding old nodes and joining new nodes. An external network can be configured firstly before starting a cloud application service, which in turn requires an order of operations of a cloud resource to be formulated (the seventh requirement).

Others: After all cloud resources are deployed, it may want to know a total count of the cloud resources and an elapsed period of time. This can be done by calculating on a counter when start and end events arrive (the eighth requirement). A web API of another system may be called when an event arrives (the eighth requirement), which may be useful for integration of different cloud resource orchestration systems.

Generally, the eight requirements above are abstracted from practical deployment automation and lifecycle management, and they, in combination, reveal the requirements for building powerful and ideal resource orchestration tools that are especially suitable in cloud context. However, nearly none of them can satisfy both the deployment time requirements and the runtime requirements of abstract cloud resources, and nearly none of them can satisfy a complete set of the eight requirements above. Even if the requirements above can be satisfied by a certain language, they may not be written using an object-oriented language, thus resulting in a limited application scope thereof. Some exiting cloud resource orchestration tools will be summarized below:

The first category of tools includes Puppet, Chef, Ansible, SaltStack, etc. These cloud resource orchestration tools have powerful performances, and even have object-oriented concepts such a class, inheritance, etc. However, these cloud resource orchestration tools are only focused on the deployment time requirements of the cloud resources, and thus lack a support for the runtime requirements of the cloud resources. Generally, after the deployment is completed, they will lose their control on the orchestration of the cloud resources. Also, these cloud resource orchestration tools can not support a complete set of the first requirement, the second requirement, and the third requirement.

The second category of tools includes Tosca. Tosca is more of a specification than an implementation. It includes a complex design for relationships between cloud resources, but still lacks a support for the runtime requirements for the cloud resources, like the first category of tools. On the other hand, if an object-oriented language can accommodate naturally the eight requirements in orchestration of cloud resources, then a benefit of using a new language such as Tosca, etc., will be very limited.

The third category of tools includes HOT, etc. HOT is a Heat Orchestration Template. It is a cloud resource orchestration tool provided by Openstack Heat. It allows viewing a cloud resource instance as in the first requirement, and a part of runtime properties as in the second requirement. However, HOT do not support defining or invoking an operation on a cloud resource at runtime as in the third requirement. Moreover, HOT involves no integration of cloud resources as in the sixth requirement. Lastly, HOT is not written in an object-oriented language, this resulting in an extra learning overhead.

The fourth category of tools includes Murano, etc. Murano is another Openstack project for orchestration of cloud resources. It supports the first requirement to the seventh requirement at deployment time and runtime of cloud resources. However, Murano makes use of a new language but do not relate to object-oriented concept. For example, in the language used by Murano, there is neither clear difference between a class and an object, nor clear control on object creation, and the cloud resource reference and composition are not as flexible as they are in an object-oriented language. Murano does not reuse the existing widely-adopted object-oriented languages in the mature community of developers, thus resulting in a limited application scope thereof. On the contrary, if the cloud resource orchestration technologies are implemented using an object-oriented language, because the object-oriented language in use is more concise and simple, there will be a significantly lowered learning overhead, and a bridge to the existing community of object-oriented language developers will be built easily.

In summary, none of the existing cloud resource orchestration tools can satisfy a complete set of the eight requirements for orchestration of cloud resources, and they can not share the benefit from orchestrating cloud resources using an object-oriented language. According to the embodiments of the present disclosure, the eight requirements for orchestration of cloud resources can be well satisfied using the concepts in an object-oriented language, such that the cloud resource orchestration technologies can be implemented using an object-oriented language. Several exemplary embodiments of the present disclosure will be described below with reference to FIG. 1 to FIG. 3.

Referring to FIG. 1, which is a flow chart of a method 100 of resource orchestration using an object-oriented language according to an embodiment of the present disclosure. As illustrated, in step 110, a correspondence relationship from concepts in the object-oriented language to requirements of resource orchestration is created. The correspondence relationship can also be referred to as mapping from the concepts in the object-oriented language to the requirements of resource orchestration.

In an embodiment, the first requirement describes static details of a cloud resource at deployment time of the cloud resource, and a cloud resource template, wherein the static details can correspond to the concept of "class" in the object-oriented language. At runtime, a cloud resource template can be deployed in multiple running "instances", thus corresponding to the concept of "object" in the object-oriented language.

In an embodiment, the second requirement describes properties of a cloud resource, which can correspond to the concept of "properties of an object" in the object-oriented language, wherein input parameters can correspond to the concept of "parameters of a constructor" in the object-oriented language, and output properties can simply correspond to the concept of "properties of an object" in the object-oriented language.

In an embodiment, the third requirement describes operations on a cloud resource, and can correspond to the concept of "method" in the object-oriented language.

In an embodiment, the fourth requirement describes a reference to a cloud resource, and can correspond to the concept of "reference to an object" in the object-oriented language, where the "reference to an object" is defined in the "class", and corresponds to the cloud resource template at deployment time. However, if a value is assigned to the "reference", both a holder and a target will be "objects", and it will correspond to one cloud resource instance referring to another at runtime.

In an embodiment, the fifth requirement describes composition of cloud resources, and can also correspond to the concept of "reference to an object" in the object-oriented language, but the referenced "object" or cloud resource instance is considered as a part of the holder.

In an embodiment, the sixth requirement describes inheritance of a cloud resource, and can correspond to the concept of "inheritance" in the object-oriented language. A "class" or resource may inherit from an interface to declare that it satisfies a specification of the interface so as to provide certain properties or operations or "methods". The "class" or resource may also inherit from a "class" to reuse codes of the class being inherited.

In an embodiment, the seventh requirement describes an operation order on a cloud resource. In the object-oriented language, the operation or "method" is called in another operation or "method". Accordingly, a language in the "method" is imperative, which means that commands are executed one by one in order, and the operation order of the cloud resource also corresponds to the concept of "method" in the object-oriented language.

In an embodiment, the eighth requirement describes events. In the object-oriented language, events such as "Start execution", "Execution all completed", "Object A's method B is being entered", "Object A's method B is completed", etc can be defined. The above content naturally correspond to events being involved in the eighth requirement, for example, Deployment started, Deployment finished, Resource instance A's operation B is being entered, Resource instance A's operation B is finished, etc.

It can be seen that the eight requirements above are naturally very close to the concepts in the object-oriented language, and brief correspondence relationship can exists among them, such that an ideal cloud resource orchestration technology can be realized based on the object-oriented language.

There are many object-oriented languages, for example, Java, C#, C++, etc. It shall be understood that the present disclosure is based on a generalized object-oriented language rather than a certain object-oriented language. Accordingly, the embodiments of the present disclosure will not be limited to any particular object-oriented language, but can be easily translated from one object-oriented language to another or implemented on another object-oriented language because these object-oriented languages share the same object-oriented language methodology.

However, since Java is the most widely adopted and the most classic object-oriented language, embodiments of the present disclosure will be described in the specification taking Java as an example. Also, using Java language also demonstrates how the present disclosure can be easily translated to or implemented on a specific object-oriented language. It shall be noted that the following specific example in Java language are not necessarily executed by a Java interpreter (JVM). Although the syntax of the following example in Java language is the same as Java, it may also be performed by an orchestration engine according to the present disclosure.

Table 1 below is an example of a cloud resource class in the Java syntax, wherein correspondence relationships between the concepts in Java language, and the first requirement to the seventh requirement are demonstrated with detailed comments. The eighth requirement will be discussed later. A cloud resource class defines what a cloud resource is, as exhibited in the deployment time requirement of cloud resources. When the class is newly created (new) into an object, the cloud resource is actually deployed as exhibited in the runtime requirement of cloud resources.

TABLE 1

Cloud resource class in Java language

```
class ResourceA         // R1: we use class to define an resource at deployment time (C1)
    extends BaseResourceB       // R6: resource inheritance; we allow inheriting only one resource class
    implements BaseResourceC, BaseResourceD, ...    // R6: others are resources interfaces
{
    @Property("input")    // Annotations are widely used to tell what this field is up to
    public int inputParameter1;     // R2: input parameters of ResourceA. They are also resource properties
    @Property("input")
    public String inputParameter2;      // R2: properties can only be primitive types, rather than objects
    ...
    @Property("output")
    public bool outputProperty1;    // R2: output properties of ResourceA.
    @Property("output")
    public double outputProperty2;
    ...
    @Reference    // Annotations are widely used to tell what this field is up to
    public ResourceE r1;    // R4: resource references
    @Reference
    public ResourceF r2;
    ...
    @Composition
    public ResourceG c1;    // R5: resource composition
    @Composition
    public ResourceH c2;    // R5: "ResourceH" here tells which resource should be composed
    ...
    public ResourceA (
        // R2: input parameters to instantiate ResourceA itself
        int inputParameter1, String inputParameter2, ...,
        // R2: input parameters to instantiate BaseResourceB
        bool baseResourceB_inputParameter1, double baseResourceB_inputParameter2, ...
        // R2: input parameters needed to instantiate c1
        long c1_inputParameter1, String c1_inputParameter2, ...
        // R2: input parameters needed to instantiate c2
        float c2_inputParameter1, int c2_inputParameter2, ...
    ) {
        // auto: means this command is carried out by orchestration engine;
        // auto: it doesn't actually need to be write in template
        super(baseResourceB_inputParameter1,  baseResourceB_inputParameter2,  ...);
// auto
        // R5: composed resources are instantiated when their holder is instantiated
        this.c1 = new ResourceG(c1_inputParameter1, c1_inputParameter2, ...);    // auto
        this.c2 = new ResourceH(c2_inputParameter1, c2_inputParameter2, ...);    // auto
        ...    // auto
        // R2: input parameters are saved as resource properties
        this.inputParameter1 = inputParameter1;    // auto
        this.inputParameter2 = inputParameter2;    // auto
```

TABLE 1-continued

Cloud resource class in Java language

```
    ...        // auto
}
public void install( )      // R3: install & remove are mandatory resource operations
    throws Exception
{
    super.install( );      // R6: install inherited base resource first      // auto
    // R5: composed resources are installed when their holder is installed
    this.c1.install( );    // auto
    this.c2.install( );    // auto
    ...    // auto
    action1;    // R3: actions to install this resource
    action2;
    ...
    this.inputParameter1;    // R2: input parameters can be used to customize the
installation
    this.inputParameter2;
    ...
    r1.property1;    // R4: we may access a referenced resource's property
    c2.property2;    // R5: same for resource composition
    ...
    // R2: output properties are assigned to expose Values provided by this resource
    this.outputProperty1 = xxx;
    this.outputProperty2 = yyy;
    ...
}
public void remove ( ) throws Exception {
    super.remove( );    // R6: remove inherited base resource first    // auto
    // R5: composed resources are removed when their holder is removed
    this.c1.remove( );    // auto
    this.c2.remove( );    // auto
    ...    // auto
    action1;    // R7: actions are executed in order
    action2;
    ...
}
public void operation3 ( ) throws Exception {    // R3: resource operations
    action1;
    action2;
    ...
    r1.operation3( );    // R4: we may invoke a referenced resource's property
    c2.operation4( );    // R5: same for resource composition
    ...
}
public void operation4 ( )
    throws Exception    // R3: operation may fail; we use Exception to report error
{
    action1;
    action2;
    ...
    r1.operation4( );    // R7: resource operations are invoked in order
    c2.operation3( );
    ...
}
...
}
```

Table 2 shown below is an example of a cloud resource interface in the Java syntax. The majority of the object-oriented languages allow inheriting from only one class but multiple interfaces, wherein a cloud resource interface also declares a cloud resource but can not be actually deployed. By inheriting from an interface, the cloud resource will also declare that it satisfies certain specification.

TABLE 2

Cloud resource interface in Java language

```
//R6: resource interface are used as specification and cannot be instantiated
interface BaseResourceC {
    // R6: resource interface provides operation specification
    public void operation5 ( ) throws Exception;
    public void operation6 ( ) throws Exception;
    ...
```

TABLE 2-continued

Cloud resource interface in Java language

```
    // R6: note that Java doesn't actually support defining properties in
interface
    // R6: but the code is executed by our orchestration engine. so we can
either allow it in engine,
    // R6: or replace properties to getter methods (does not change Java
syntax).
    public int property1;
    public String property2;
    ...
}
```

Table 3 shown below is a main entrance of executing of cloud orchestration in Java syntax. In the object-oriented languages, this is realized by using a main( ) method. Herein a first cloud resource instance is newly created to trigger dependent cloud resource instances of the first cloud resource instance to be instantiated recursively.

TABLE 3 main( ) Entrance in Java language

```
// the entrance where the first resource class is instantiated into an object
public static void main ( ) throws Exception {
    // R4: user controls how & when referenced resources are created;
    // R4: they are not like composed resources
    ResourceE a__r1 = new ResourceE(r1__argument1, r1__argument2, ...);
    a__r1.install( );
    ResourceF a__r2 = new ResourceE(r2__argument1, r2__argument2, ...);
    a__r2.install( );
    // R1: class defines what a resource specification (C1);
    // R1: newing an object (or call it instantiating an object) creates
    // R1: the actual running instance (C2)
    ResourceA a = new ResourceA(
        argument1, argument2, ...
        baseResourceB__argument1, baseResourceB__argument2, ...
        c1__argument1, c1__argument2, ...
        c2__argument1, c2__argument2, ...
    );
    a.r1 = a__r1;    // R4: user control when referenced resources are assigned to their
holder
    a.r2 = a__r2;    // R4: if install( ) uses referenced resources, assign them before install( )
    a.install( );    // R1: by calling install( ), the resource instance is actually deployed
    ResourceA a2 = new ResourceA(    // R1: one class may deploy into multiple instances
/ objects
        argument1__2, argument2__2, ...
        baseResourceB__argument1__2, baseResourceB__argument2__2, ...
        c1__argument1__2, c1__argument2__2, ...
        c2__argument1__2, c2__argument2__2, ...
    );
    a2.r1 = a__r1;
    a2.r2 = a__r2;
    a2.install( );
}
// after main( )
// orchestration engine tracks all resource object newed and their hierarchy
// user may view their tree list, check property values or invoke operations
```

How the correspondence relationships from the concepts in java language to the eight requirements for orchestration of cloud resources are satisfied will be described below specifically in combination with the examples in Java language depicted in Table 1 to Table 3 above, wherein a part of details have been described in the comments of Table 1 to Table 3 above.

With respect to the first requirement, the concept of "class" is used in the examples above in Java language to define what a cloud resource is at deployment time. The class can be newly created, i.e., instantiated to an "object", to indicate that the cloud resource is actually created in runtime. In main( ), it can be seen that one cloud resource class can be instantiated into multiple cloud resource instances.

With respect to the second requirement, the cloud resource properties correspond to the concept of "object properties" in an object-oriented language, in the examples above in Java language. Input parameters shall be passed in from a "class" constructor because a cloud resource needs these parameters to start actual deployment. There are also input parameters for an inherited cloud resource and a composed cloud resource. The cloud resource properties can be accessed from a public component or inside an operation, and this also corresponds to the common behavior of concepts of "object properties" and "methods" in the object-oriented language. Annotation is used to indicate that it is input parameters or output properties in the examples above in Java language.

With respect to the third requirement, operations on a cloud resource correspond to the concept of "method" in an object-oriented language in the examples above in Java language. In Java language, "methods" is defined inside a cloud resource class. There are mandatory methods "install" and "remove" to be used for deployment and redeployment of cloud resources. In the "methods" or operations, all sorts of operations such as accessing properties and invoking other operations that can be realized in the object-oriented language can be performed.

With respect to the fourth requirement, a referenced object corresponds to the concept of "reference to an object" in an object-oriented language, and it is also an "object property", in the examples above in Java language. It refers to a cloud resource object which is newly created and passed in from outside this class. Accordingly, its properties can be accessed or its operations can be invoked as that can be realized in the object-oriented language. From the examples above in Java language, users can decide when and where to instantiate the referenced cloud resource and pass it into this class. In the examples above in Java language, Annotation is used to indicate it is a referenced cloud resource or a composed cloud resource.

With respect to the fifth requirement, a composed cloud resource also corresponds to the concept of "reference to an object" in an object-oriented language, and it is also an "object property", in the examples above in Java language. It refers to a cloud resource object which shall be created and managed locally inside this class. Unlike a referenced resource which is passed in from the outside, the composed resource is considered as a part of this class and managed inside the class. This class shall instantiate the composed resources in a constructor, and invoke its install( ) and remove( ) of them when this class invokes them. In other words, the referenced resource is managed by a user, and a composed resource is managed by this class.

With respect to the sixth requirement, just as a "class" can inherits from a base class and an interface, inheritance of a cloud resource is corresponded to as such, in the examples above in Java language. Inheriting from only one class but multiple interfaces that is allowed also applies to the majority of the object-oriented languages. By inheriting from a base class, it is necessary to invoke counterpart of its parent constructor function (also referred to as super correspondent) in a constructor, i.e., install and remove. By inheriting from a cloud resource interface, it is necessary to provide specified operations and properties in a class. It shall be noted that Java does not support defining object properties inside an interface, but because codes are actually executed by an orchestration engine according to the present disclosure, this practice may be allowed. If it is wanted to avoid Java from being modified, then the properties may be changed to a Java getter method.

With respect to the seventh requirement, codes in a "method" in an object-oriented language are naturally executed in order in the examples above in Java language. In main( ) and a cloud resource operation, there is an order for any items to be executed therein. Actually an execution order of any elements from the templates in Java language from Table 1 to Table 3 above is predictable. Disregarding internal optimization of JVM, Java holds the same semantics.

With respect to the eighth requirement, some object-oriented languages such as Java, etc. do not have any prepackaged events (but C# has). However, these events can be easily implemented because all the templates are executed by an orchestration engine as defined in the present disclosure. The engine knows where it begins, where it ends, and at what time whose operation is entered or finished, so it can send out events. Cloud resource operations can be registered as an event handler. A customized action can be performed when an event arrives.

Main( ): this is the entrance of overall execution in the examples above in Java language, wherein a first cloud resource object is instantiated herein, and its component cloud resources are newly created recursively. The actions in main( ) are executed one by one until all of them are completed or an exception is thrown out. A resource orchestration engine will record all created cloud resource objects, and their reference or composition hierarchy. Accordingly, users may later view their tree list, check property values, invoke operations, or refer to an existing object in the next deployment.

Auto: in the examples above in Java language, the following are tagged as "//auto": invoking a constructor of a base cloud resource, instantiating a composed cloud resource, assigning input parameters to object properties, invoking install( ) and remove( ) of the base cloud resource, invoking install( ) and remove( ) of a composed cloud resource, etc. These codes are routines and shall be mandatory, so they are automatically executed by a resource orchestration engine according to the present disclosure, and the user does not need to actually write them. Alternatively, those routine codes can be automatically generated using a code generator.

Action: it can be seen that there are many "actions" in each operation in the codes of the examples above in Java language. Actions can be reading of assigned properties, newly creating an object, or invoking an operation. Actions can also be common cloud resource orchestration commands widely seen in the existing cloud resource orchestration tools such as installing a RPM package, invoking a shell script, executing some operation, starting/stopping a service, and writing a configuration file, etc.

Although the object-oriented concepts as used in the codes of the examples above in Java language are described as above, these object-oriented concepts will not be limited to Java, but the following concepts in the common object-oriented methodologies will be applicable: "class", "interface", "object", "object properties", "object references", "methods", "main( )", etc. "Exception" is widely supported in languages such as Java, C++, C#, Python, etc. "Annotation" is supported in languages such as Java, C#, Python, etc. For those languages which do not support "annotation", it can be added directly (because the resource orchestration engine actually executes the codes) or specially formatted comments may be used instead.

In summary, the first requirement to the eighth requirement are satisfied by using the common object-oriented methodologies, and demonstrated in Java language, but the present disclosure will not be limited to using Java language. Also, the present disclosure can use language such as Java language without any syntax modification.

Further referring to FIG. 1, in step 115, a workflow for implementing the resource orchestration and based upon the correspondence relationship from the concepts in the object-oriented language to the requirements of resource orchestration is created. According to that shown in Table 1 to Table 3, the above workflow, executed by the resource orchestration engine, according to the present disclosure can be the same as that in Java. With respect to other object-oriented languages, because the concepts being used among them are the same, their workflows can also remain the same.

Specifically, the workflow above can include deployment time workflow and runtime workflow.

The first step in a deployment time workflow is entering main( ), wherein actions are executed one by one. When a cloud resource object is newly created, a class constructor is invoked, and input parameters are passed thereto. Firstly a constructor of a base cloud resource class shall be invoked, and then composed cloud resources are newly created, and input parameters are assigned to object properties. When a composed cloud resource is newly created, the step of instantiating a cloud resource object can be performed recursively because the composed cloud resource may have more composed cloud resources therein. It shall be noted that newly creating a cloud resource object may not necessarily deploy it, wherein the operation of newly creating it is performed by invoking install( ). After main( ) is completed, all cloud resources shall be deployed.

In other words, the cloud resource orchestration engine executes the same workflow as that of Java. Cloud resources are created when they are newly created, and thereafter enter a runtime workflow. When install( ) is invoked, the cloud resources are deployed. The performance of the steps above recursively creating and deploying cloud resources based on their relationship of composing or hierarchy. Creation and deployment of the referenced cloud resource are managed by user written codes. These codes shall be passed into their holder at proper time.

Alternatively or additionally, in some embodiments, the cloud resource orchestration engine records all the created cloud resource objects, and their reference or composition hierarchy in runtime. Users can view a tree list of running cloud resources. Users can read the property values of these cloud resources, or invoke their operations. Users may refer to an existing object in another deployment to read its runtime properties. A reference from a separate deployment can be a unique character string name or an object handle.

Further referring to FIG. 1, in step 120, a resource orchestration template for resource orchestration is created, wherein the resource orchestration template indicates the correspondence relationship created in the step 110 and the workflow created in the step 115. In fact, the examples in Java language shown in Table 1 to Table 3 above are a resource orchestration template for resource orchestration. Accordingly, after the Java codes shown in Table 1 to Table above are written, the step of creating a resource orchestration template can be deemed as being completed.

It shall be understood that the step 120 is an abstracted step of creating a resource orchestration template, and in fact, only the correspondence relationship created in the step 110, and the workflow created in the step 115 are required in resource orchestration, and the resource orchestration template created in the step 120 is a carrier of the correspondence relationship and the workflow above. Accordingly, the step 120 can be omitted without affecting the implementing of the resource orchestration technologies using an object-oriented language according to the present disclosure.

Further referring to FIG. 1, in the step 125, a resource orchestration engine configured to implement resource orchestration according to the resource orchestration template is created. According to an embodiment of the present disclosure, the resource orchestration engine is such a component that takes the resource orchestration template as an input, and that can perform resource orchestration based upon the resource orchestration template. Accordingly, when using the Java codes as shown in Table 1 to Table 3 above as a resource orchestration template, the resource orchestration engine is such a component that can read the Java codes in the resource orchestration template and perform resource orchestration using the Java codes.

It shall be understood that the step 120 is an abstracted step of creating a resource orchestration engine, and in fact, only the correspondence relationship created in the step 110, and the workflow created in the step 115 are required to implement resource orchestration, and the resource orchestration engine created in the step 125 is only an abstracted implementer of the above resource orchestration. Accordingly, the step 125 can be omitted without affecting the implementing of the resource orchestration technologies using an object-oriented language according to the present disclosure.

Next, in the step 130, the resource orchestration is implemented according to the resource orchestration template by the resource orchestration engine. As explained in the description of the step 125, the resource orchestration engine is such a component that takes the resource orchestration template as an input and that can perform resource orchestration based upon the resource orchestration template. Accordingly, in step 130 the resource orchestration engine can read the Java codes in the resource orchestration template and perform resource orchestration using the Java codes.

Also, as described above, because in an embodiment of the present disclosure, it is eventually intended to implement resource orchestration according to the correspondence relationship created in the step 110, and the workflow created in the step 115, and the step 120 of creating a resource orchestration template and the step 125 of creating a resource orchestration engine can therefore be omitted in resource orchestration. Thus, the step 130 can be simplified such that resource orchestration is implemented according to the correspondence relationship and the workflow in case that the step 120 and the step 125 are omitted.

The method 100 method 100 of resource orchestration using an object-oriented language according to an embodiment of the present disclosure has been described above with reference to FIG. 1. It shall be understood that and as described above, the description of these steps will not suggest or imply that all the illustrated steps shall be performed to achieve a desirable result. Additionally or alternatively, some steps or potential sub-steps may be omitted, multiple steps or potential sub-steps may be combined into one step or sub-step to be performed, and/or one step or potential sub-step may be decomposed into multiple steps or sub-steps to be performed. Also, at least some of the steps above may be performed in a different order or concurrently, for example, the step 110 of creating the correspondence relationship, and the step 115 of creating the workflow.

From another perspective of analyzing the method 100 method 100 of resource orchestration using an object-oriented language according to an embodiment of the present disclosure described above with reference to FIG. 1, the method 100 above of resource orchestration using an object-oriented language, and the resource orchestration engine defined therein can be implemented with a number of effects. Firstly the orchestration is extended to cover the deployment time and the runtime to thereby bring the operational continuity. The information obtained at deployment time can be maintained and standardized to facilitate managing the deployed resources at runtime. Moreover, the runtime resources can have a standard mode for interoperation using the object-oriented methodologies. For example, it can be done through invoking an API, accessing properties, providing a deployed resource with an inherence relationship, or linking a deployed resource as a reference.

Moreover, a bridge to connect the requirements of orchestration to any existing object-oriented language, and the mature community of developers using the language can be obtained. Also, bridges between any types of existing resource orchestration languages can be obtained. The bridges can be interoperable because all of them share the same object-oriented methodologies. In another example, the requirements for resource orchestration are identified clearly as the eight requirements, such that they can be implemented easily in the resource orchestration engine.

Figure 2:
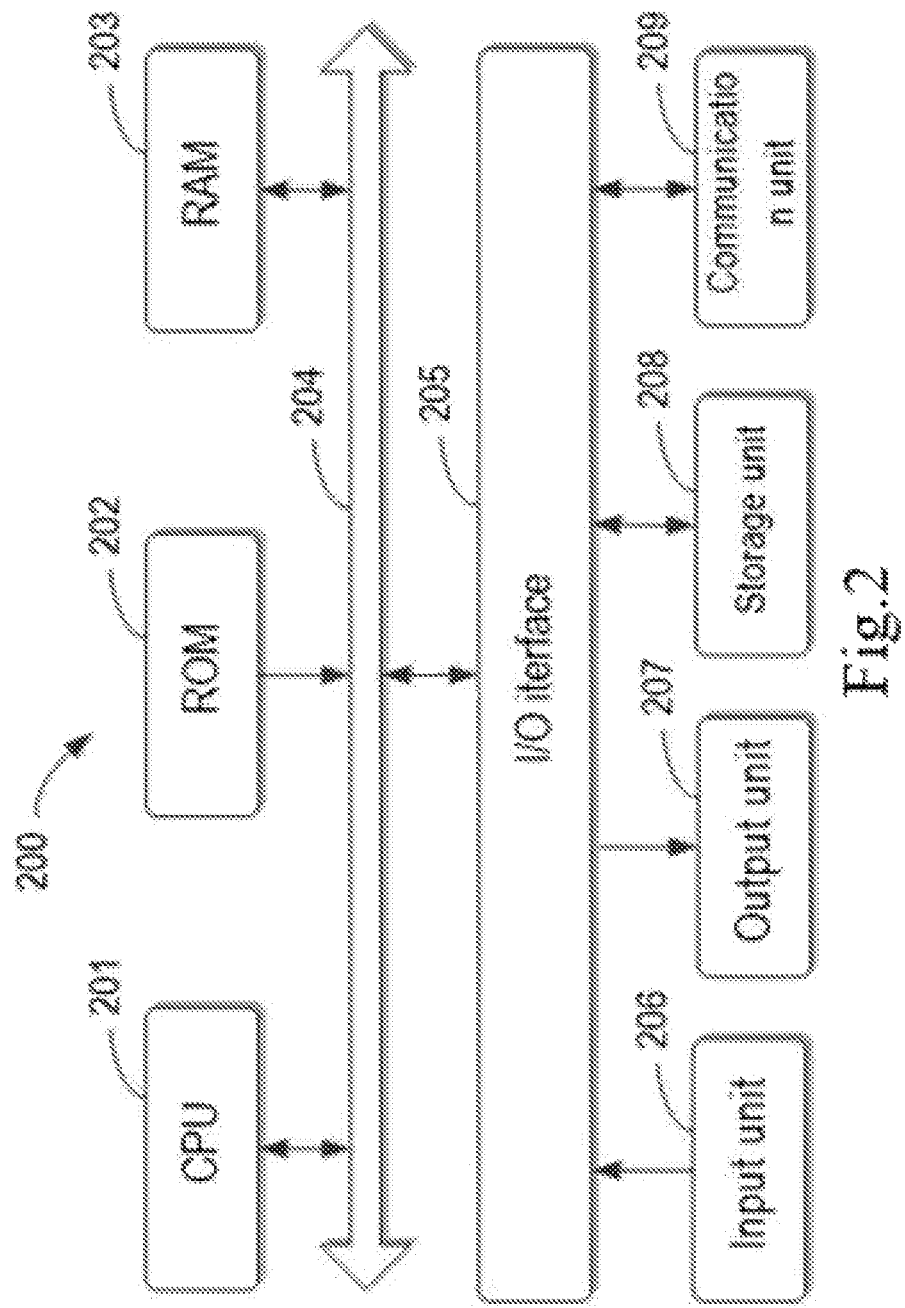
FIG. 2 is a block diagram of a computer device for implementing the method of resource orchestration using an object-oriented language according to an embodiment of the present disclosure.

Referring to FIG. 2, which is a block diagram of a computer device 200 for implementing the method 100 of resource orchestration using an object-oriented language according to an embodiment of the present disclosure. As illustrated in FIG. 2, the computer device 200 includes a Central Processing Unit (CPU) 201, a Read Only Memory (ROM) 202, a Random Access Memory (RAM) 203, a bus 204, an I/O interface 205, an input unit 206, an output unit 207, a storage unit 208, and a communication unit 209. It shall be understood that the block diagram illustrated in FIG. 2 is illustrated merely for the purpose of an example, but not intended to limit the scope of the present disclosure. In some cases, some components may be added or omitted as desirable in practice. Instructions for implementing the method 100 of resource orchestration using an object-oriented language are stored in the storage unit 208. When the instructions are executed by the CPU 201, the computer device 200 performs the method 100 of resource orchestration using an object-oriented language according to the embodiments of the present disclosure.

Figure 3:
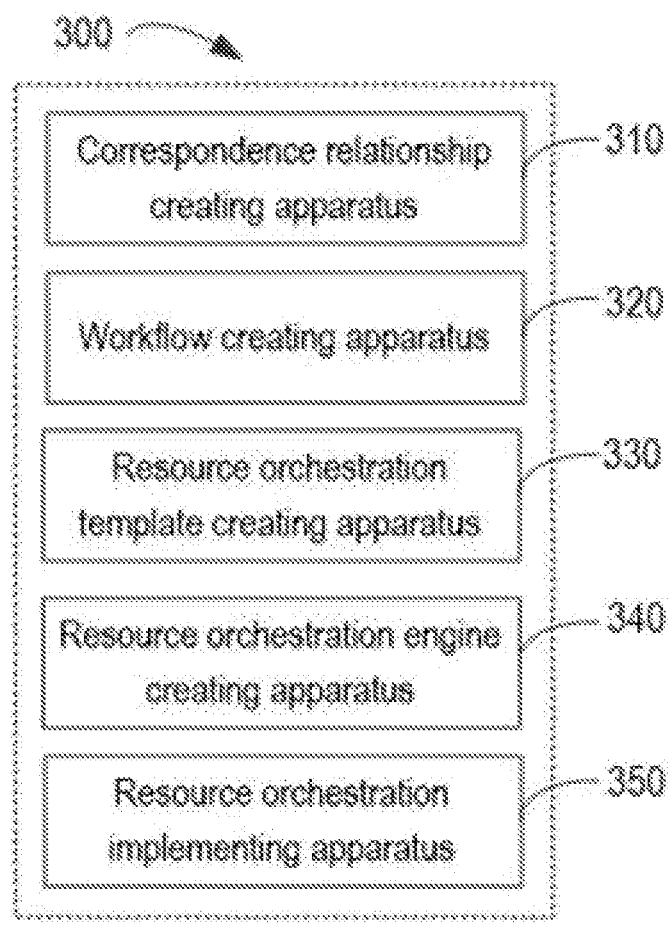
FIG. 3 is a block diagram of a resource orchestration device using an object-oriented language according to an embodiment of the present disclosure.

Referring to FIG. 3, which is a block diagram of an device 300 of resource orchestration using an object-oriented language according to an embodiment of the present disclosure. As illustrated in FIG. 3, the device 300 of resource orchestration using an object-oriented language includes a correspondence relationship creating apparatus 310, a workflow creating apparatus 320, a resource orchestration template creating apparatus 330, a resource orchestration engine creating apparatus 340, and a resource orchestration implementing apparatus 350. Specifically, the correspondence relationship creating apparatus 310 is configured to create a correspondence relationship from concepts in the object-oriented language to requirements of resource orchestration; the workflow creating apparatus 320 is configured to create a workflow of resource orchestration based upon the correspondence relationship from the concepts in the object-oriented language to the requirements of resource orchestration; the resource orchestration template creating apparatus 330 is configured to create a resource orchestration template for resource orchestration; the resource orchestration engine creating apparatus 340 is configured to create a resource orchestration engine for implementing resource orchestration according to the resource orchestration template; and the resource orchestration implementing apparatus 350 is configured for the resource orchestration engine to implement resource orchestration according to the resource orchestration template.

The respective apparatuses in the device 300 of resource orchestration using an object-oriented language are generally configured to perform the respective steps in the method 100 of resource orchestration using an object-oriented language. Accordingly, the respective features described above for the method 100 of resource orchestration using an object-oriented language can be equally applicable to the apparatus 300 of resource orchestration using an object-oriented language, so a repeated description thereof will be omitted herein. Accordingly, as described above for the method 100 of resource orchestration using an object-oriented language, the description of the respective apparatuses in the apparatus 300 of resource orchestration using an object-oriented language will not suggest or imply that all the illustrated apparatuses shall be included to achieve a desirable result. Additionally or alternatively, some steps or potential sub-apparatuses may be omitted, multiple apparatuses or potential sub-apparatuses may be combined into one apparatus or sub-apparatus to be performed, and/or one apparatus or potential sub-apparatus may be decomposed into multiple apparatuses or sub-apparatuses to be performed.

Moreover, according to an embodiment of the present disclosure, the device 300 for orchestrating resources using an object-oriented language as described with reference to FIG. 3 can be embodied in various implementations. For example, the device can be embodied in software in some embodiment. For example, the device 300 of resource orchestration using an object-oriented language can be embodied as a part of a resource orchestration application using an object-oriented language, or another software system which can be invoked by the application. At this time, the respective apparatuses in the device 300 of resource orchestration using an object-oriented language can be embodied as software modules. Alternatively, the device 300 of resource orchestration using an object-oriented language can be embodied partially or completely in hardware. For example, the device 300 of resource orchestration using an object-oriented language can be embodied as an Integrated Circuit (IC) chip, an Application-Specific Integrated Circuit (ASIC), a Field Programmable Gateway Array (FPGA), a System on Chip (SoC), etc. At this time, the respective apparatuses in the device 300 of resource orchestration using an object-oriented language can be embodied as modules or elements in hardware. Other implementations known so far or to be developed later will also be feasible, and the scope of the present disclosure will not be limited thereto.

Furthermore the embodiments of the present disclosure can alternatively be embodied in the form of a computer program product, which is tangibly stored on a non-transitory computer readable medium and includes machine executable instructions, the machine executable instructions, when being executed, o cause a machine to perform the respective steps in the method 100 of resource orchestration using an object-oriented language according to the embodiments of the present disclosure.

As can be understood from the description above, the concepts in an object-oriented language can support a complete set of the eight requirements for orchestration of cloud resources. Since the eight requirements for orchestration of cloud resources can correspond naturally to the concepts in the object-oriented language, orchestration of cloud resources can be realized using the object-oriented language to thereby make the cloud resource orchestration template more concise and simpler. Moreover, since nearly all the existing cloud resource orchestration tools operate with their own template languages, there are a large number of similar languages. Accordingly, if they are unified into a single object-oriented language, the orchestration of cloud resources will be simplified and an overhead of learning the specific languages for the existing cloud resource orchestration tools will be lowered. Moreover, the object-oriented language is a widely adopted mature language, so, if the object-oriented language is applied in the field of orchestration of cloud resources, then the bridge from orchestration of cloud resources to the largest community of developers worldwide will be built, thus making it possible to better develop the cloud resource orchestration technologies. In summary, the object-oriented language is the optimum solution to orchestration of cloud resources.

It shall be noted that the embodiments of the present disclosure can alternatively be embodied in hardware, software, or a combination of hardware and software. The components in hardware can be embodied in dedicated logics; and the component in software can be stored in a memory and performed by an appropriate instruction execution system, for example, a microprocessor or a piece of specially designed hardware. Those ordinarily skilled in the art can appreciate the foregoing method of and device can be embodied in computer executable instructions and/or included in processor control codes, for example, such codes are carried in a carrier medium, for example, a magnetic disk, a CD or a DVD-ROM, a programmable memory, for example, a read only memory (firmware), or a data carrier, for example, an optical or electronic signal carrier. The apparatus and the components thereof according to the present disclosure can be embodied in, for example, a very large scale integrated circuit or a gate array, a semiconductor, for example, a logic chip, a transistor, etc., or a programmable hardware device, for example, a field programmable gate array, a programmable logic device, etc., in software performed by a variety of processors or in combination of the foregoing hardware circuit and software, for example, in firmware.

Although the present disclosure has been described in connection with several particular embodiments, it shall be appreciated that the present disclosure will not be limited to the disclosed particular embodiments. The present disclosure is intended to encompass various modifications and equivalent arrangements falling into the sprit and scope of the appended claims. The appended claims shall be accorded the broadcast interpretations so as to encompass all these modifications as well as equivalent structures and functions.

We claim:

1. A method of resource orchestration using an object-oriented language, comprising:
creating a correspondence relationship from concepts in the object-oriented language to a requirement of resource orchestration;
creating a workflow for implementing the resource orchestration and based upon the correspondence relationship; and
implementing the resource orchestration based upon the correspondence relationship and the workflow;
wherein the requirement includes:
a deployment time requirement indicating details on resources and a relationship between the resources at a deployment time of the resources; and
a runtime requirement specifying an operation to be performed on the resources after the deployment time.

2. The method according to claim 1, further comprising:
creating a resource orchestration template for the resource orchestration, the resource orchestration template indicating the correspondence relationship and the workflow; and
implementing further resource orchestration based upon the resource orchestration template.

3. The method according to claim 2, further comprising:
creating a resource orchestration engine configured to implement resource orchestration according to the resource orchestration template; and
wherein the further resource orchestration based upon the resource orchestration template is implemented via the resource orchestration engine.

4. The method according to claim 1, wherein the operation includes at least one of:
monitoring of states of the resources;
a direct operation on the resources; and
an addition of a relationship between the resources.

5. The method according to claim 4, wherein the direct operation includes at least one of installing, removing, and extending of the resources.

6. The method according to claim 1, wherein resources for the resource orchestration are cloud resources.

7. A method of resource orchestration using an object-oriented language, comprising:
creating a correspondence relationship from concepts in the object-oriented language to a requirement of resource orchestration;
creating a workflow for implementing the resource orchestration and based upon the correspondence relationship; and
implementing the resource orchestration based upon the correspondence relationship and the workflow;
wherein the requirement includes at least one of:
a first requirement describing a static detail and a resource template of resources at a deployment time of the resources;
a second requirement describing a property of the resources;
a third requirement describing an operation to be performed on the resources after the deployment time;
a fourth requirement describing a reference to the resources;
a fifth requirement describing composition of the resources;
a sixth requirement describing inherence of the resources;
a seventh requirement describing an operation order of operations; and
an eighth requirement describing an event of the resource orchestration.

8. The method according to claim 7, wherein the correspondence relationship includes:
a first correspondence relationship between a concept of "class" and a concept of "object" in the object-oriented language, and the first requirement, wherein the concept of "class" corresponds to the static detail and the concept of "object" corresponds to the resource template;
a second correspondence relationship between a concept of "a property of an object" in the object-oriented language and the second requirement;
a third correspondence relationship between a concept of "method" in the object-oriented language, and the third and seventh requirements;
a fourth correspondence relationship between a concept of "object reference" in the object-oriented language, and the fourth and fifth requirements;
a fifth correspondence relationship between a concept of "inherence" in the object-oriented language and the sixth requirement; and
a sixth correspondence relationship between a concept of "event" in the object-oriented language and the eighth requirement.

9. The method according to claim 7, further comprising:
creating a resource orchestration engine configured to implement resource orchestration according to a resource orchestration template; and
implementing further resource orchestration based upon the resource orchestration template via the resource orchestration engine.

10. The method according to claim 7, wherein resources for the resource orchestration are cloud resources.

11. An electronic device, comprising:
a processor; and
a memory coupled to the processor and storing instructions executable by the processor, the instructions, when executed by the processor, causing the electronic device to:
create a correspondence relationship from concepts in the object-oriented language to a requirement of resource orchestration;
create a workflow for implementing the resource orchestration and based upon the correspondence relationship; and
implement the resource orchestration based upon the correspondence relationship and the workflow;
wherein the requirement includes:
a deployment time requirement indicating details on resources and a relationship between the resources at a deployment time of the resources; and
a runtime requirement specifying an operation to be performed on the resources after the deployment time.

12. The electronic device according to claim 11, wherein the instructions, when executed by the processor, further cause the electronic device to:

create a resource orchestration template for the resource orchestration, the resource orchestration template indicating the correspondence relationship and the workflow; and implement further resource orchestration based upon the resource orchestration template.

13. The electronic device according to claim 12, wherein the electronic device is constructed and arranged to:

create a resource orchestration engine configured to implement resource orchestration according to the resource orchestration template; and wherein the electronic device, when implementing further resource orchestration, is constructed and arranged to implement the further resource orchestration based upon the resource orchestration template via the resource orchestration engine.

14. The electronic device according to claim 11, wherein the operation includes at least one of:

monitoring of states of the resources;

a direct operation on the resources; and an addition of a relationship between the resources.

15. The electronic device according to claim 14, wherein the direct operation includes at least one of installing, removing, and extending of the resources.

16. The electronic device according to claim 11, wherein resources for the resource orchestration are cloud resources.

17. An electronic device, comprising:

a processor; and a memory coupled to the processor and storing instructions executable by the processor, the instructions, when executed by the processor, causing the electronic device to:

create a correspondence relationship from concepts in the object-oriented language to a requirement of resource orchestration;

create a workflow for implementing the resource orchestration and based upon the correspondence relationship; and implement the resource orchestration based upon the correspondence relationship and the workflow;

wherein the requirement includes at least one of:

a first requirement describing a static detail and a resource template of resources at a deployment time of the resource;

a second requirement describing a property of the resources;

a third requirement describing an operation to be performed on the resources after the deployment time;

a fourth requirement describing a reference to the resources;

a fifth requirement describing composition of the resources;

a sixth requirement describing inherence of the resources;

a seventh requirement describing an operation order of operations; and an eighth requirement describing an event of the resource orchestration.

18. The electronic device according to claim 17, wherein the correspondence relationship includes:

a first correspondence relationship between a concept of "class" and a concept of "object" in the object-oriented language, and the first requirement, wherein the concept "class" corresponds to the static detail and the concept of "object" corresponds to the resource template;

a second correspondence relationship between a concept of "a property of an object" in the object-oriented language and the second requirement;

a third correspondence relationship between a concept of "method" in the object-oriented language, and the third and seventh requirements;

a fourth correspondence relationship between a concept of "object reference" in the object-oriented language, and the fourth and fifth requirements;

a fifth correspondence relationship between a concept of "inherence" in the object-oriented language and the sixth requirement; and a sixth correspondence relationship between a concept of "event" in the object-oriented language and the eighth requirement.

19. The electronic device according to claim 17, wherein the electronic device is constructed and arranged to:

create a resource orchestration engine configured to implement resource orchestration according to a resource orchestration template; and implement further resource orchestration based upon the resource orchestration template via the resource orchestration engine.

20. The electronic device according to claim 17, wherein resources for the resource orchestration are cloud resources.

* * * * *